United States Patent [19]

Yata et al.

[11] Patent Number: 4,930,902
[45] Date of Patent: Jun. 5, 1990

[54] NURSING BOTTLES

[76] Inventors: Akio Yata, 22-13, Nakamaru Kanagawa-Ku, Yokohama-City, Kanagawa-Prefecture; Kuniko Aida, 671-188, Oogi Yachimata-Cho, Inba-Gun, Chiba-Prefecture, both of Japan

[21] Appl. No.: 319,153

[22] Filed: Mar. 3, 1989

[30] Foreign Application Priority Data

Mar. 5, 1988 [JP] Japan .................................. 63-52411
Dec. 13, 1988 [JP] Japan ........................... 63-160876[U]

[51] Int. Cl.⁵ ......................... A61J 9/02; G01K 1/14; G01K 1/02
[52] U.S. Cl. ................................. 374/150; 215/11.2; 340/586; 340/691
[58] Field of Search ........... 374/150; 215/11.2, 100 R; 340/586, 691

[56] References Cited

U.S. PATENT DOCUMENTS

| | | | |
|---|---|---|---|
| 2,357,692 | 9/1944 | Saffady | 374/150 |
| 2,547,337 | 4/1951 | McKeen | 374/150 X |
| 3,326,358 | 6/1967 | Singleton | 215/100 R |
| 3,546,942 | 12/1970 | Thiele | 374/150 X |
| 3,864,976 | 2/1975 | Parker | 374/150 X |
| 4,241,839 | 12/1980 | Alberghini | 215/100 R |
| 4,718,776 | 1/1988 | Gilland et al. | 374/150 X |
| 4,730,744 | 3/1988 | Vinciguerra | 215/11.1 X |
| 4,801,922 | 1/1989 | Worrell et al. | 340/586 |

FOREIGN PATENT DOCUMENTS

| | | |
|---|---|---|
| 2048291 | 10/1970 | Fed. Rep. of Germany ...... 374/150 |
| 1358496 | 3/1964 | France ................................ 374/150 |
| 62-06831 | 1/1987 | Japan . |
| 62-117537 | 7/1987 | Japan . |

Primary Examiner—Daniel M. Yasich
Attorney, Agent, or Firm—Kenyon & Kenyon

[57] ABSTRACT

A nursing bottle is provided with a detachable case mounted to the bottom of the bottle. A temperature sensor is mounted in the case for measuring the temperature of a liquid in the bottle and for providing a temperature signal which is processed by an electronic circuit which is also located in the case. The electronic circuit provides an alarm signal responsive to a predetermined temperature which activates an alarm means. The temperature sensor is suitably mounted by an elastic body which resiliently forces the temperature sensor into contact with the bottom of the nursing bottle. The electronic circuit suitably includes a one chip microprocessor for processing the temperature signal.

16 Claims, 8 Drawing Sheets

31-LIGHT SOURCE ALARM

NURSING BOTTLES

BACKGROUND OF THE INVENTION

The present invention relates to nursing bottles. More particularly, it relates to nursing bottles having a function of indicating the inner temperature of the liquid contained therein.

It is necessary to feed milk kept at a proper temperature in suckling the baby using a nursing bottle. If the temperature of milk is too high, the baby can be burnt. On the other hand, if the temperature of milk is too low, the baby can suffer from a laxity of bowels. Among other things, milk prepared at improper temperature is likely to be rejected by the baby.

Generally, the artificial feeding of milk to the baby is carried out by pouring warmed water to a nursing bottle, then the dry milk is dissolved in it and the milk is cooled to a proper temperature, which is normally at about 36° C. plus/minus 2° C. (96° F. plus/minus 3.6° F.). In order to determine the proper temperature the sensuous method, such as touching the nursing bottle or dropping a small amount of milk to the hand, is normally used. However, such sensuous methods can be unreliable for various reasons, e.g. the surface temperature of the hand.

Varous porposals have been made so far for the nursing bottles that can detect temperature without relying on the sensuous methods. One proposal is to detect temperature by the change of color using, e.g. heat sensitive paints or thermolabels, as disclosed in Japanese Utility Model Application Kokai Nos. 55-19609, 60-106634, 55-45387, 61-173038 and 62-1627.

While detection of the temperature of the inner liquid can be achieved by putting a bar thermometer, such as analog alcohol bar thermometer, into the liquid, not only it is a cumbersome job to do but also it can be bad for the health. Similarly, provision of a thermometer inside the bottle should be avoided in view of sanitation.

Thus, attempts have been made to detect the inner temperature from the outside by laying a thermometer within the material of the bottle or by attaching a thermometer on the side of the bottle or, alternatively, by sticking a bimetal thermometer or a digital liquid crystal thermometer to the outside of the bottle, as disclosed in Japanese Utility Model Application Kokai Nos. 63-38529, 56-116044, 62-148235, 57-5235, 57-113142, 61-171974, 59-69738 and 60-184544.

The Japanese Utility Model Application Kokai No. 62-117537 discloses a nursing bottle that indicates the liquid temperature digitally. As shown in FIG. 7, the bottle 11 is equipped with a thermoconductive thin film 12 and a sealing cap 13. The cap 13 is connected with a holding cap 17 which is equipped with a bar thermosensor 14, thermal detector 15 and a thermometer 16. The thin film 12 is extended by the action of the bar thermosensor 14, and the temperature of the milk is detected by the thermosensor 14 though the thin film 12.

Further, the Japanese Utility Model Application Kokai No. 62-6831 discloses a nursing bottle shown in FIGS. 10 and 11. A signal processor 18 is provided at the bottom of a bottle 11 which is provided, at the bottom, a concentric circular thermoelectric element 19. A temperature indicator 20 and a buzzer 21 are provided at the upper part of the bottle 11, which are connected to the signal processor 18 with a wiring 22.

However, according to the prior art of detecting the liquid temperature from the outside either by laying an analog bar thermometer inside the material of the bottle, or by providing it on the outer surface of the bottle, defects may not be avoided such as difficulty in reading the scale of the thermometer, particularly when the feeding of milk is made at night.

A digital indication of the temperature is much favorable by being able to indicate the temperature every moment. Generally, however, it is difficult to detect the accurate temperature if a digital liquid crystal thermometer is equipped intimately on the outer surface of the bottle due to the low thermoconductivity of the bottle made of glass or plastic materials. Further, the indicated temperature and the actual inner temperature may generally be different due to radiation of heat by air on the outer surface of the bottle.

For instance, where temperature is detected with the thermosensor 14 through the thin film 12 according to the proposal of the Japanese Utility Model Application Kokai No. 62-117537, the inner liquid must touch the thin film 12 either by making the bottle 11 upside down or by swinging the bottle in order to detect the accurate temperature, as shown in FIG. 8. Even so, a difference of temperature may result if the bottle 11 is allowed to stand for a while after touching of the thin film 12 to the liquid. Moreover, the nursing bottle by this proposition necessitates inconvenience that, as shown in FIG. 9, the sealing cap 13 attached to the opening of the bottle 11 and the holding cap 17 equipped with the thermosensor 14 must be taken off, after detection of temperature, and that a nipple 23 and and a nipple cap 24 must be fitted to the opening of the bottle 11. Still further, the temporary storage of the sealing cap 13, the nipple 23 and the nipple cap 24 causes another problem of sanitation.

Aside from the problem of accurate detection of the inner temperature, the nursing bottle requires sterilization by boiling and this is also true with the nipple and the nipple cap that contact the baby. The proposal made by the Japaense Utility Model Application Kokai No. 62-6831 would cause difficulty in sterilizing it by boiling, since the temperature indicator 20, the buzzer 21, the signal processor 18 and the wiring 22 are united with the bottle 11.

OBJECT OF THE INVENTION

The present invention is, therefore, to provide nursing bottles that can detect temperature of the liquid accurately and that causes no problem in sterilizing by boiling, thus overcoming the drawbacks involved in the prior art nursing bottles. The accurate temperature may be indicated, e.g. by sound or light.

SUMMARY OF THE INVENTION

According to one embodiment of the invention, there is provided a nursing bottle which comprises (1) a bottle, the upper opening of which being equipped with a detachable nipple and a cap, (2) a detachable case fitted to the bottom of the said bottle, and (3) a means for indicating the temperature of a liquid inside the bottle, which means being built in the said case.

According to the preferred embodiment of this invention, the said means for indicating temperature comprises a temperature indicator, a substrate supporting the electronic circuit, a thermosensor detecting the temperature of the liquid in the bottle, and an elastic body supporting the said thermosensor.

Also, according to a preferred embodiment of this invention, the indication of temperature may be effected by using a liquid crystal indicator.

According to another preferred embodiment of this invention, the indication of temperature may be effected by using a digital thermal indicator.

According to still another preferred embodiment of this invention, a dent is provided at the bottom of the bottle, whereby a closed space is formed, between the said case and the bottom of the said bottle, when the detachable case is fitted to the bottom of the bottle.

Such a dent may be made by making the center of the body of the bottle thinner.

According to yet another preferred embodiment of this invention, the elastic body supporting the thermosensor pushes the said themosensor upward so as to get the said thermosensor in close touch with the dent at the bottom of the bottle, when the case is fitted to the bottom of the bottle.

According to a further preferred embodiment of this invention, the case may be made detachable to the bottle by providing a protruding portion, or height, on the part of the case and by providing a groove on the part of the bottom of the bottle, whereby snap-engaging the case and the bottle.

The case should support the bottle, when they are engaged, so that the bottle may stand firmly.

Thus, the nursing bottle of this invention comprises a detachable nipple and a cap fitted to an opening of a bottle, and a detachable case fitted to the bottom of the said bottle, and a means for indicating the temperature of a liquid inside the bottle, which means being built in the said case and being preferably a digital liquid crystal apparatus. Therefore, with the nursing bottle of this invention, there is no need for exchaning the nipple and the cap with the case building in the temperature indicating appratus, and it is possible to indicate the temperature, while the nipple and the cap are fitted to the bottle.

Also, with the nursing bottle of this invention, there is no need for swinging the bottle or making it upside down, as the case building in the temperature indicating appratus may be fitted to the bottom of the bottle. The temperature of the inner liquid may be determined accurately, through the bottom of the bottle, by means of the temperature indicating appratus fitted to the bottom of the bottle.

Due to the attachment of the case to the bottom of the bottle, it becomes quite easy to detect the inner temperature accurately, even when the bottle stands, containing a liquid at a small amount.

Further, there is no difficulty in sterilizing the bottle, the nipple and the cap by boiling since the case is detachable to the body of the bottle. This was not the case where, as the prior art, the temperature indicating unit, the signal processor and the wiring are united with the body of the bottle.

According to the present invention, a closed space may be formed between the bottom of the bottle and the case, when the case is fitted to the bottle. As described above, it is difficult to make the inner and outer temperatures meet due to the radiation of heat on the surface of the bottle. With the present invention, however, an accurate detection of the inner temperature may become possible by the formation of a space between the case and the bottom of the bottle, whereby cutting off aeration.

According to the present invention, a digital liquid crystal appratus for indicating temperature may comprise a digital liquid crystal temperature indicator, a substrate and a thermosensor. The inner temperature may be indicated digitally, whereby the proper temperature may be noticed.

According to this invention, not only the appratus supports the thermosensor but only it is provided with an elastic body that pushes the thermosensor upward. Thus, the top of the thermosensor is pushed upward by means of the elastic body to contact closely the bottom of the bottle, whereby a good thermal sensitivity may be achieved. It is preferable that a dent is provided at the bottom of the bottle so that the bottom of the bottle may get into closer contact with the top of the thermosensor pushed upward by repulsion of the elastic body in order to obtain a better thermal sensitivity of the sensor.

According to another aspect of this invention, there is provided a nursing bottle, which comprises (1) a bottle, the upper opening of which being equipped with a detachable nipple and a cap, (2) a detachable case fitted to the bottom of the said bottle, and (3) a means for alarming a proper temperature of a liquid inside the bottle, which means being built in the said case.

Such an alarming means may comprise a sensor measuring the temperature of the liquid in the bottle, a substrate supporting an electronic circuit that processes the signals from the said sensor, an alarming part driven by the said electronic circuit and alarming the proper temperature, and an elastic body supporting the said alarming part.

The alarming part may be either a sound source or a light source.

Where it is a sound source, it may be, for example, a buzzer, an electronic chime or an electronic music box.

Where it is a light source, it may be, for example, a light emitting diode.

The sensor may be a thermister temperature element.

The indicator of the liquid temperature may be provided on the surface of the case which is fitted to the bottom of the bottle.

The indicator of the liquid temperature is preferably composed of a liquid crystal.

The indicator of the liquid temperature is preferably of digital.

In the nursing bottle equipped with an alarming means, it is preferable that a dent is provided at the bottom of the bottle, whereby a closed space is formed, between the case and the bottom of the bottle, when the detachable case is fitted to the bottom of the bottle.

Such a dent may be made by making the central body of the bottle thinner.

It is preferable that an elastic body supporting the thermosensor pushes the said themosensor upward so as to get the said thermosensor in close touch with the dent at the bottom of the bottle, when the case is fitted to the bottom of the bottle.

This may be achieved as follows. Namely the case may be made detachable to the bottle by providing a protruding portion, or height, on the part of the case and by providing a groove on the part of the bottom of the bottle, whereby snap-engaging the case and the bottle.

The case should support the bottle, when they are engaged, so that the bottle may stand firmly.

It is preferable that a battery or batteries may be provided detachably so as to supply electricity to the alarming means.

According to this invention, an alarming means such as sound source or light source may preferably be provided, in addition to the digital liquid crystal thermoindicator. By so providing, it may become feasible that, in addition to the indication of temperature, sound from a buzzer or flashing of a light emitting diode alarms the proper temperature of the milk.

It is preferable that a dent is provided at the center of the bottom of the bottle by making it thinner. Also it is recommended to make the bottle a raised bottom.

According to the present invention, a sound source such as buzzer, an electronic chime or an electronic music box and/or a light source such as a light emitting diode are provided within the case. The sound of the buzzer or the flashing of the light emitting diode alarms the proper temperature, normally 36° C. plus/minus 2° C. (96.8° F. plus/minus 3.6° F.), while one is engaged in other jobs or is taking care of the baby. The sound of buzzer fits particularly for the blind.

According to the present invention, a circuit substrate loading, e.g. a one chip microcomputer is provided in the case. The CPU of the microcomputer processes comparatively the temperature detected by the thermister and the proper temperature range, previously input, to operate the light and/or sound source to alarm that the liquid temperature is within the proper range.

The objects and features mentioned above and other objects and features of this invention will become clearer by reference to the further description and to the drawings attached hereto.

EXAMPLES

Examples according to the present invention will be explained with reference to the drawings.

Figure 1:
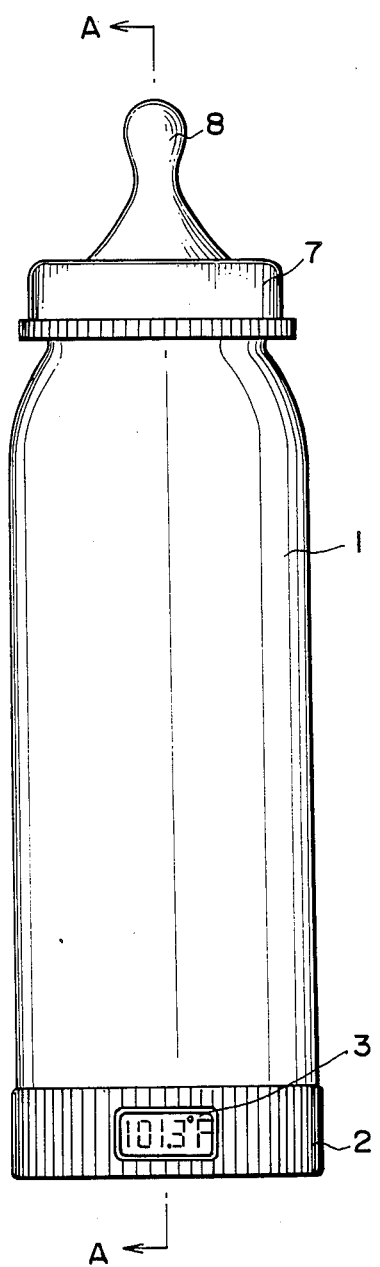
FIG. 1 is the front view of an embodiment of this invention.
Figure 2:
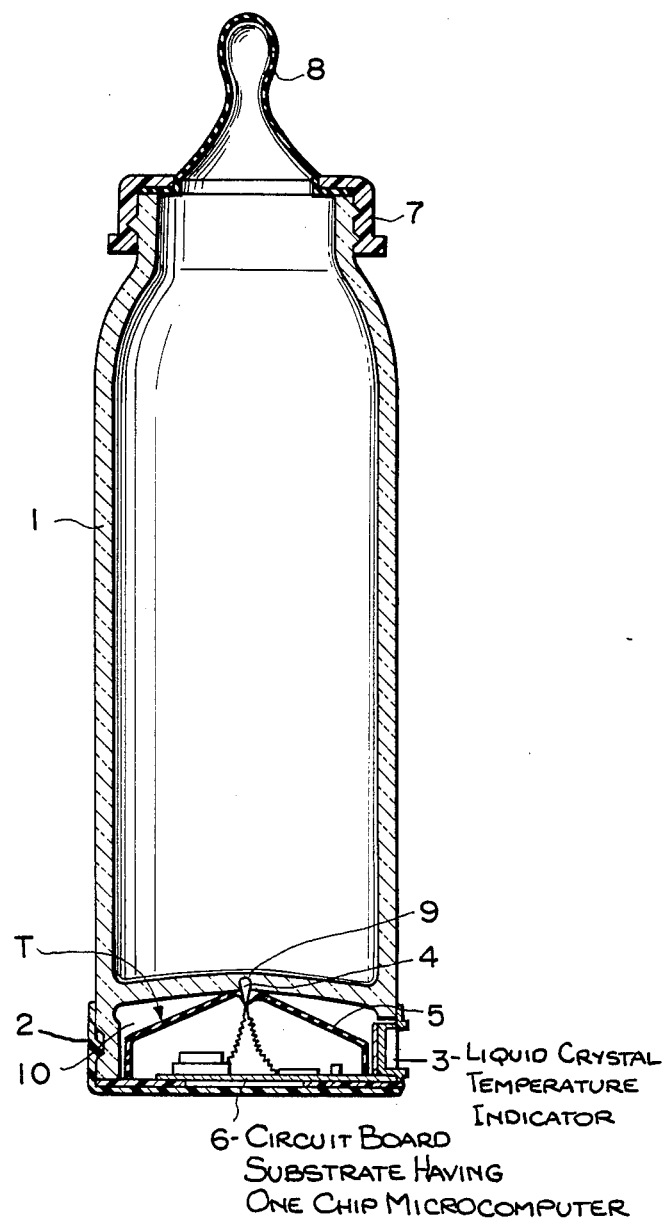
FIG. 2 is the cross sectional view along the line A-A' of the same embodiment.

FIG. 1 is the front view of an embodiment of this invention. FIG. 2 is the cross sectional view along the line A-A' of the embodiment. As shown by the drawings, the bottom of of the body of the nursing bottle 1 (referred to sometimes as the body) is fitted with the case 2. In this Example, the case 2 is fitted to the bottom of the body 1 by engaging the protruding portion, or height, on the part of the case provided inward and the groove on the part of the bottom of the bottle. The case 2 may be released from the bottom of the body 1 by detaching the height from the groove. Namely, the case 2 is composed detachably against the bottom of the body 1 as shown in the Example.

The case 2 contains a built-in digital liquid crystal appratus T for indicating temperature that comprises a digital liquid crystal temperature indicator 3, a thermosensor 4, an elastic body 5 supporting and pushing upward the said thermosensor, and a substrate 6.

As shown, a cap 7 and a nipple 8 are fitted to the opening of the body 1. The botttom of the body 1 is raised and the center of which is made into a dent 9 by making thinner the thickness of that part than the other part of the bottom. As shown, the top of the thermosensor is supported by the elastic body 5 at the center. The top of the thermosensor 4 and the substrate 6 are connected electrically to each other with wiring. By repulsion of the thermoelastic body 5, such as rubber or spring, the top of the thermosensor 4 is pushed upward toward the dent 9 and comes into close contact with the dent 9 provided at the center of the raised bottom.

The substrate 6 and the digital liquid crystal temperature indicating part 3 are also connected electrically.

For exemplification, FIG. 1 shows that the digital liquid crystal temperature indicator 3 indicates the temperature of 38.5° C. (101.3° F.) of the liquid contained in the body 1. As described above, a standard temperature suitable for suckling is within the range of 36° C. plus/minus 2° C. (96.8° F. plus/minus 3.6° F.), so the temperature indicated in FIG. 1 is within a high region (HI).

When the temperature is detected at the top of the thermosensor 4 closely contacted with the bottom of the body 1, it is indicated digitally on the digital liquid crystal temperature indicating part 3 through the substrate 6. It is possible for the digital liquid crystal temperature indicator 3 not only to indicate the temperature value, such as 38.5° C. (101.3° F.), but also to indicate words, such as "HI" at a high temperature region and "LO" at a low temperature region. The temperature range may be changed by inputting it previously to the substrate 6.

The substrate 6 comprises a circuit substrate such as a printed board and is equipped with a control part comprising, e.g. a one chip microcomputer.

As shown in FIG. 2, a closed space 10 is formed between the case 2 and the bottom of the body 1, when the case 2 (hereinafter referred to as the "temperature case") is fitted to the bottom of the body 1.

As described above, according to the present invention, a digital liquid crystal temperature apparatus T that indicates the temperature of the liquid contained in the nursing bottle is built in the temperature case 2, which is fitted detachably to the bottom of the body 1. At the same time, the nipple 8 and the cap 7 are fitted to the opening of the body 1.

Thus, unlike the prior art proposals, no change between the nipple 8 and the cap 7, and the temperature case 2 equipped with the digital liquid crystal temperature apparatus T is required, and thus it becomes possible that the temperature may be indicated while the nipple 8 and the cap 7 are fitted to the body 1. Since the temperature case 2 is fitted to the bottom of the body 1, it becomes unnecessary to make the body 1 upside down or swing it, and the temperature of the liquid contained in the body 1 may be detected accurately, through the bottom of the body 1, by the temperature indicating appratus T in the temperature case 2. Thus, by fitting the temperature case 2 at the bottom of the body 1, it becomes possible to detect the accurate temperature with a minimum error even if the nursing bottle is allowed to stand, since the liquid stays at the bottom of the body 1.

According to the present invention, the case 2 and the body 1 is detachable each other. So, only the body 1, the nipple 8 and the cap 7 may be sterilized by boiling. This was not feasible in the prior art where the temperature indicator, the signal processor and the wiring are united to the nursing bottle.

According to the present invention, there is formed a closed space 10 composed of the case 2 and the bottom of the body 1, when the case 2 is fitted to the bottom of the body 1.

Generally, due to the heat radiation on the surface of the nursing bottle it is difficult to make the temperature coincide between the outer surface and the inside of the bottle. By means of formation of the closed space 10 between the case 2 and the bottom of the body 1, however, the heat radiation at the bottom of the body 1 may be minimized and the accurate indication of the inner temperature becomes possible.

According to the present invention, the digital liquid crystal temperature indicating apparatus T comprises the digital liquid crystal temerature indicator 3, the substrate 6 and the thermosensor 4, whereby the proper temperature is notified. Moreover, according to the present invention, the apparatus T is equipped with the elastic body 5 which not only support but also push upward the thermosensor 4.

By so doing, the top of the thermosensor 4 comes into close contact with the bottom of the body 1, by the upward action of the elastic body 5, to create a good thermal sensitive condition.

Further, according to the present invention, a dent 9 is provided at the bottom of the body 1. The top of the thermosensor 4 pushed upward by the action of the elastic body 5 becomes much more closer contact with the bottom of the body 1 by means of the dent 9, whereby a much better thermal sensitivity of the thermosensor 4 may be achieved.

Figure 3:
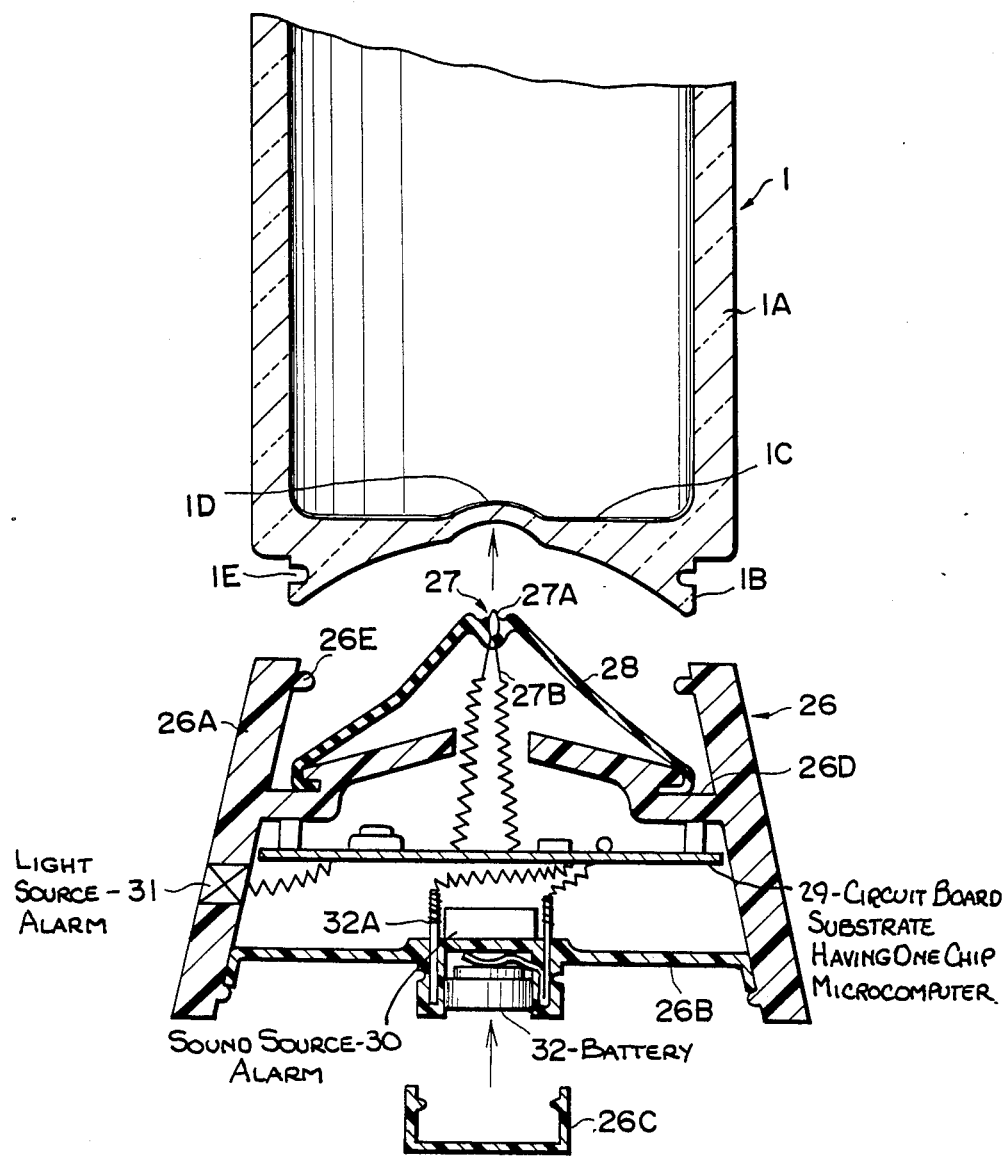
FIG. 3 is the cross sectional view, or the deal drawing in part, of another embodiment of this invention.
Figure 4:
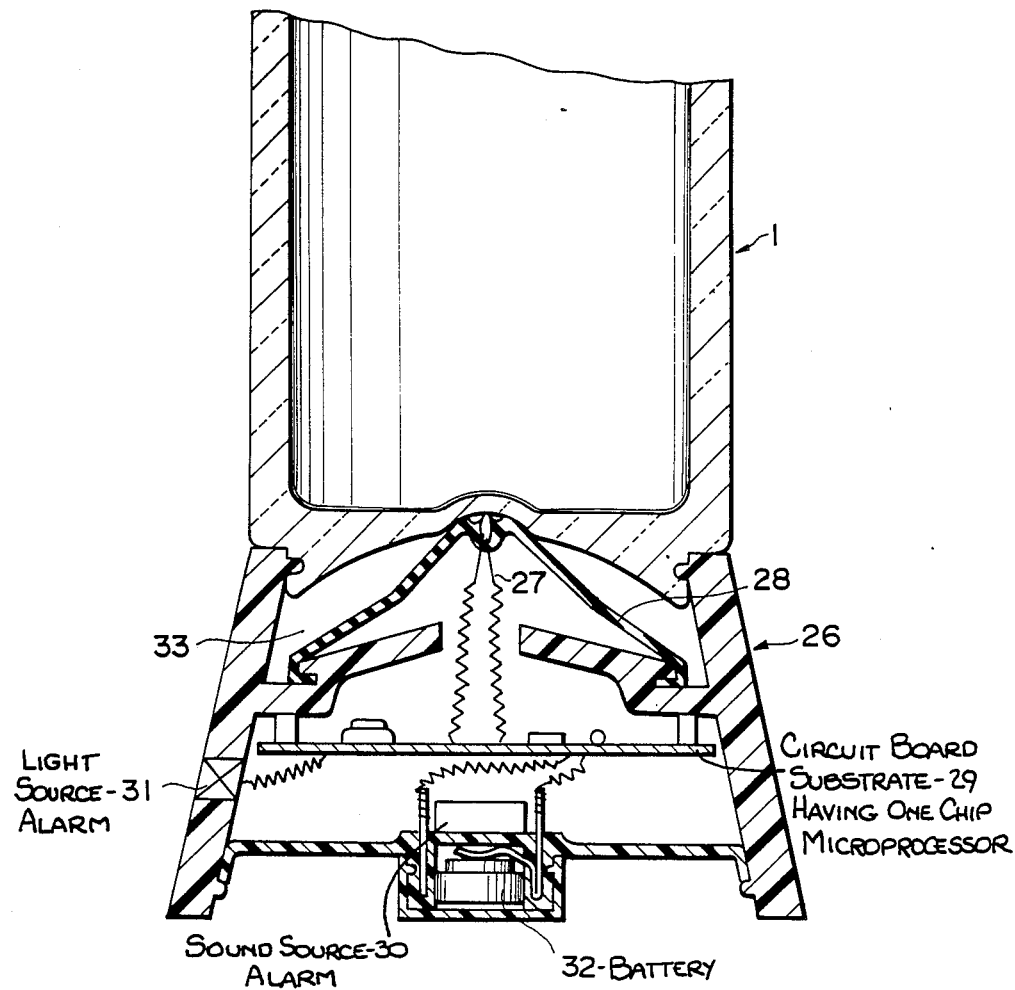
FIG. 4 is the built-up cross sectional view of the same embodiment.

Reference is now made to the FIGS. 3 and 4.

FIG. 3 is the cross sectional view of one of the embodiment of this invention in which the bottle body, the case detachable to the body and the water-proof cap for exchanging battery are shown separately.

FIG. 4 is the cross sectional view of the assembled parts.

In this embodiment, the upper opening of the body 1 is not shown in the Figures. However, the cap 7 and the nipple 7 shown in FIGS. 1 and 2 are also fitted to the opening of the body 1 in this embodiment, too.

With the embodiment shown in these Figures, at the bottom of the body 1, the inner circumferential part 1B having the smaller diameter than that of the outer circumferential part 1 (that is to say the outer surface of the body) is provided downward. The curved, raised bottom 1C is provided upward from the inner circumferential part 1B toward the inside of the body 1. At the center of the raised bottom 1C, there is provided the groove 1D, which is composed thinner.

The thermister 27, the elastic body 28, the circuit substrate 29, the sound source 30, the light source 31 and the battery 32 are united in the case 26.

The heat detective part 27A of the thermister 27, which is composed as the contact type, is contacted with the outer side of the bottom of the body 1 and plays the role of detecting the inner temperature of the liquid contained in the body 1. The thermister 27 is supported by the elastic body 28 at the center, with elastic body 28 being positioned below the thermister 27. Upon contact with the outer side of the body 1, the thermister 27 may be fixed by repulsive power or movement upwards generated by the structure of elastic body 28 into close contact with the outside of the bottom of the body 1.

As described above, according to the present invention, the bottom of the body 1 is finely devised and this enables, coupled with the action of the elastic body 28, a more precise and quicker detection of the temperature. The elastic body 28 is composed, for example, by a rubber or a spring.

As shown in FIG. 4, the thermister 27 is connected to the circuit substrate 29 by means of the conductor 27B. The circuit substrate 29 is composed, for example, by a resin board. Although not shown, the substrate 29 is provided with a circuit by means of, e.g. printing. The circuit substrate 29 is equipped with a one chip microcomputer, a crystal oscillating element, a battery and an output terminal for the external connection. The output terminal for the external connection is connected to the light source 31 consisting of, e.g. a light emitting diode or to the sound source consisting of, e.g. a buzzer, an electronic music box or an electronic chime, which is embedded in the side wall of the case 26.

One example of the operational procedure is: detecting the temperature with the thermosensor thermister 27, actuating the crystal oscillating element to emit the reference frequency (such as response by clock pulse of once a second), switching on the light source 31 or sounding the sound source 30 by means of the terminal function of the output terminal for the external connection via the one chip microcomputer.

The CPU (central processing unit) of the one chip microcomputer carries out the logical and the comparative operations in accordance with the control program for the proper temperature range stored in the memory element and outputs, being within the proper temperature range, to the light source 31 or the sound source 30 via the output terminal for the external connection.

Figure 5:
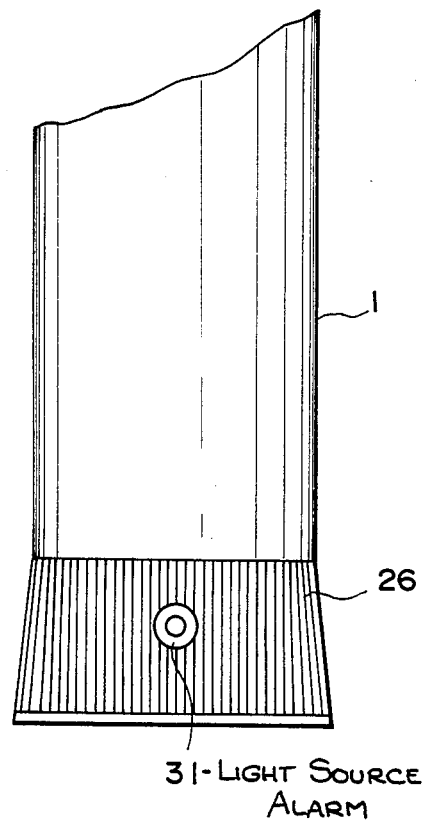
FIG. 5 is the front view of still another embodiment of this invention.

FIG. 5 is the front view of the nursing bottle when looked from the side of the light source 31.

In addition to the battery for the circuit substrate 29, there is provided the other battery 32 at the bottom of the case 26 for operating the light source 30 or the light source 31 which can require a considerable demand.

Japanese Utility Model Application Kokai No. 62-6831 discloses a model which utilizes the temperature difference generated upon cooling hot water in a bottle. With this system, the electromotive force generated by the thermoelectric effect of the thermoelement is charged to a capacitor of a large capacity. However, a large number of thermoelements are needed for charging the electromotive force of mV level, utilizing the temperature difference for a short period of time. Thus, it would appear theoretically and practically impossible to use the electromotive force as the electric source, generated by the thermoelectric effect of the thermoelectric elements utilizing the temperature difference for the short period of time in order to operate the emission elements or the buzzer. Here, the thermoelement consists of two different metals (e.g. copper and constantan) and generates the electric force of mV level with the change of the temperature, by utilizing the thermoelectric effect caused by the temperature difference.

The thermister, which may be employed in the present ivention, is composed of the resistance bulb element that is the sintered metal oxide (the metal being, e.g. nickel, manganese or cobalt). With the thermister, the resistance changes, unlike the thermoelements, with inverse proportion as the temperature changes.

At the bottom of the case body 26A of the case 26, there is provided the cover 26B for placing a battery. At the inner face of the cover 26B, there is provided the sound source 30 such as a buzzer.

At the center of the cover 26B there is placed a battery 32 for operating the sound source or the like, which battery being connected with the circuit substrate 29 through the terminal 32A, and further with the sound source 30 and the light source 31.

As shown in FIG. 3, the battery 32 may be exchanged by releasing the water-proof cap 26C of the U-shaped cross section.

The circuit substrate 29 may be supplemented by a circuit constituent so as to discontinue the buzz (e.g. by adoption of a timer circuit), whereby saving the demand of the battery 32.

As exemplified by the Example, the elastic body 28 is provided on the intermediate part 26D of the case 26 in order to support the thermister 27. The circuit substrate 29 is provided under the intermediate part 26D, under which a sound source 30 such as a buzzer is provided at the inner face of the case for placing buttery 26B. On the reverse side of the case 26B there is placed a buttery, which is fixed with the detachable water-proof cap 26C.

Within the side wall of the case 26A, there is embedded the light source 31 such as a light emitting diode so that the emission may be observed from the outside.

The case 26 and the bottle may be united by engaging the protruding part 26E at the upper part of the case 26A and the groove 1E at the inner circular part 1B of the bottom of the bottle. The engagement can be released detachably, whereby sterilization by boiling may be effected easily.

Likewise, the water-proof cap 26C and the cover 26B may be united by engaging the protruding part and the groove.

Similarly they may be separated to enable easy exchange of the battery.

A closed space 33 may be formed between the bottom of the bottle 1 and the case 26 by fixing the both. The space may disturbs the aeration and decreases the radiation of heat at the surface of the bottom, and thus, contributes to an accurate detection of the temperature of the liquid.

Figure 6:
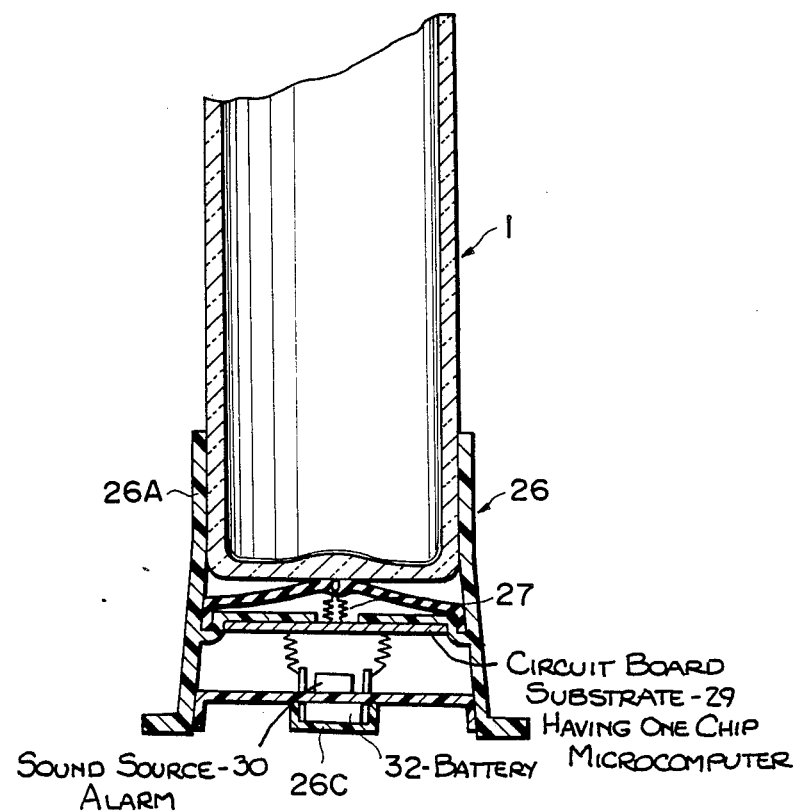
FIG. 6 is the cross sectional view of the still another embodiment.
Figure 7:
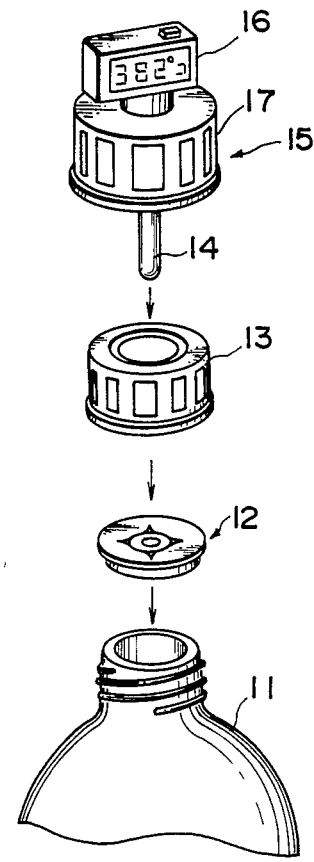
FIG. 7 is the perspective deal drawing of an embodiment of prior art.
Figure 8:
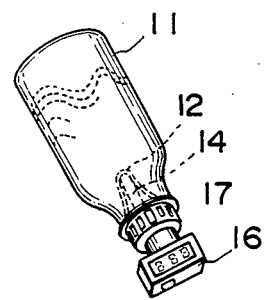
FIG. 8 is an explanatory drawing of a used condition of the embodiment of FIG. 7.
Figure 9:
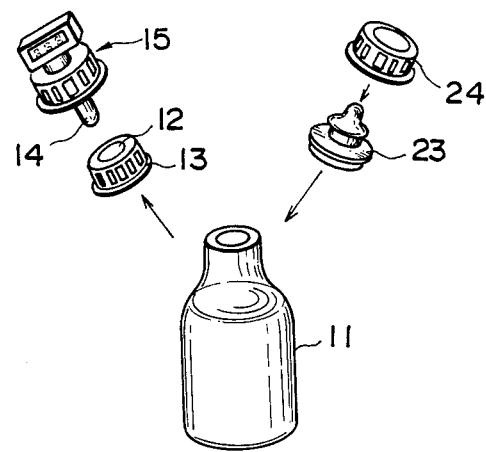
FIG. 9 is another drawing of the embodiment of FIG. 7 that explains the used condition of the embodiment.
Figure 10:
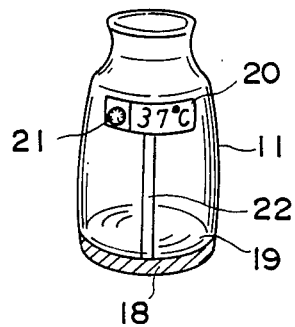
FIG. 10 is an explanatory drawing of another embodiment of prior art.
Figure 11:
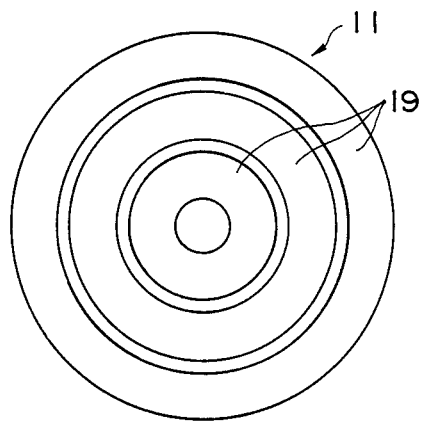
FIG. 11 is the bottom view of the embodiment of FIG. 10.

A further explanation will be given with reference to FIG. 6, which is another embodiment of the present invention.

In the previous embodiment, the bottle 1 was provided with a thinner groove 1D at the bottom. However, in this embodiment, there is no such groove and the bottom of the bottle is nearly flat, since the embodiment is applied to normal nursing bottles.

With this embodiment, the frame, or the side wall of the case 26A is extended upward and the mouth of the frame is engaged with the bottom of the bottle 1. With the weights of the bottle and the liquid contained therein, the thermister 27 pushed upward with the elastic body 28 detects the temperature, when the bottle and the case are engaged, and the sound source 30 and the light source 31 are operated.

Thus, in addition to the digital liquid crystal temperature indicator, the appratus according to the present invention may be equipped with the sound source 30 and/or the light source 31.

The digital liquid crystal temperature indicator may be provided, e.g. on the other side of the wall of the case, opposite to the light source. Since this part is connected with the circuit substrate 29, the temperature detected with the thermister 27 may be indicated on the digital liquid crystal temperature indicator, as well as by means of the light source 31 and the sound source 30.

Although the present invention was explained with reference to the specific embodiments, the scope of the present invention is not limited to those embodiments, as far as the spirit of this invention is not changed, and various modifications may be possible. For example, the positions of the circuit substrate and of the sound source may be changed arbitrarily, as far as they are united in the case.

EFFECT OF THE INVENTION

In summary, according to the present invention, there are provided nursing bottles that can conveniently be sterilized by boiling, that can indicate the inner temperature accurately and that can alarm the proper temperature by a liquid crystal indicator, a sound source and/or a light source, which are practically quite valuable.

What is claimed is:

1. A nursing bottle which comprises a bottle for holding a liquid and having an upper opening and a bottom, said upper opening having means for receiving a detachable nipple and a cap;
   a detachable case fitted to said bottom of said bottle;
   sensor means mounted in said case and contacting said bottle for measuring temperature of said liquid in said bottle and for providing a temperature signal representative of said measured temperature;
   electronic circuit means mounted in said case for receiving and processing said temperature signal provided by said sensor means and for providing an alarm signal responsive to a predetermined temperature;
   alarm means mounted in said case for receiving said alarm signal and for providing an alarm responsive to said predetermined temperature.

2. A nursing bottle as claimed in claim 1 wherein said alarm means includes a sound source alarm.

3. A nursing bottle as claimed in claim 2 wherein said sound source alarm is a member selected from the group consisting of a buzzer, an electronic chime, and an electronic music box.

4. A nursing bottle as claimed in claim 1 wherein said alarm means includes a light source alarm.

5. A nursing bottle as claimed in claim 4 wherein said light source alarm is a light emitting diode.

6. A nursing bottle as claimed in claim 1 wherein said alarm means includes a sound source alarm and a light source alarm.

7. A nursing bottle as claimed in claim 1 wherein said sensor means includes a thermister temperature element.

8. A nursing bottle as claimed in claim 1 which further includes a liquid temperature indicator means disposed on said case for providing a visual temperature indication representative of said temperature measured by said sensor means.

9. A nursing bottle as claimed in claim 8 wherein said liquid temperature indicator means comprises a liquid crystal.

10. A nursing bottle as claimed in claim 8 wherein said visual temperature indication is digital.

11. A nursing bottle as claimed in claim 1 wherein a dent is provided at the bottom of said bottle and wherein a closed space is formed between said case and said bottom of said bottle when said detachable case is fitted to said bottom of said bottle.

12. A nursing bottle as claimed in claim 11 wherein said bottom of said bottle has a center portion and a remainder portion and said dent is provided by making said center portion thinner than said remainder portion of said bottom of said bottle.

13. A nursing bottle as claimed in claim 12 wherein an elastic support is provided in said case for supporting said sensor means and said elastic body resiliently pushes said sensor means upward in close contact with said dent in said bottom of said bottle when said case is fitted to said bottom of said bottle.

14. A nursing bottle as claimed in claim 1 wherein an outer portion of said bottom of said bottle is provided with a groove and said case is provided with a protruding portion snap-engaging said groove when said case is fitted to said bottom of said bottle.

15. A nursing bottle as claimed in claim 1 wherein when said case is fitted to said bottom of said bottle, said bottle stands firmly.

16. A nursing bottle as claimed in claim 1 wherein said case has a bottom and a battery is detachably attached to said bottom of said case, said battery being provided for supplying electricity to said alarm means.

* * * * *